United States Patent
Calmon et al.

(10) Patent No.: US 10,853,720 B1
(45) Date of Patent: Dec. 1, 2020

(54) TRAFFIC CONDITION FORECASTING USING MATRIX COMPRESSION AND DEEP NEURAL NETWORKS

(71) Applicant: EMC IP Holding Company LLC, Hopkinton, MA (US)

(72) Inventors: Tiago Salviano Calmon, Rio de Janeiro (BR); Percy E. Rivera Salas, Rio de Janeiro (BR); Diego Salomone Bruno, Niterói (BR)

(73) Assignee: EMC IP Holding Company LLC, Hopkinton, MA (US)

(*) Notice: Subject to any disclaimer, the term of this patent is extended or adjusted under 35 U.S.C. 154(b) by 813 days.

(21) Appl. No.: 15/497,798

(22) Filed: Apr. 26, 2017

(51) Int. Cl.
*G06N 3/04* (2006.01)
*G06N 3/08* (2006.01)
*G08G 1/01* (2006.01)

(52) U.S. Cl.
CPC ........... *G06N 3/04* (2013.01); *G06N 3/08* (2013.01); *G08G 1/0129* (2013.01)

(58) Field of Classification Search
CPC ................................................... G08G 1/0129
See application file for complete search history.

(56) References Cited

U.S. PATENT DOCUMENTS

| 2017/0154347 | A1* | 6/2017 | Bateman | G06Q 30/0202 |
| 2017/0161614 | A1* | 6/2017 | Mehta | G06N 20/00 |
| 2018/0240047 | A1* | 8/2018 | Mu | G06Q 10/04 |

OTHER PUBLICATIONS

Marble et al, "Recent advances in the exploratory analysis of interregional flows in space and time", 1997, Innovations in GIS 4, pp. 75-88. (Year: 1997).*
Mozolin et al, "Trip distribution forecasting with multilayer perceptron neural networks: A critical evaluation", 2000, Transportation Research Part B 34, pp. 53-73. (Year: 2000).*
Mussone et al, "OD Matrices Estimation From Link Flows by Neural Networks and PCA", 2006, IFAC Proceedings Volumes, vol. 39, Issue 12, pp. 165-170. (Year: 2006).*

(Continued)

*Primary Examiner* — Alexey Shmatov
*Assistant Examiner* — Clint Mullinax
(74) *Attorney, Agent, or Firm* — Ryan, Mason & Lewis, LLP

(57) ABSTRACT

Traffic condition forecasting techniques are provided that use matrix compression and deep neural networks. An illustrative method comprises obtaining a compressed origination-destination matrix indicating a cost to travel between pairs of a plurality of nodes, wherein the compressed origination-destination matrix is compressed using a locality-aware compression technique that maintains only non-empty data; obtaining a trained deep neural network trained using the compressed origination-destination matrix and past observations of traffic conditions at various times; and applying traffic conditions between two nodes in the compressed origination-destination matrix at a time, t, to the trained deep neural network to obtain predicted traffic conditions between the two nodes at a time, $t+\Delta$. A tensor can be generated indicating an evolution of traffic conditions over a time span using a stacked Origination-Destination matrix comprising a plurality of past observations representing the time span.

20 Claims, 9 Drawing Sheets

(56) References Cited

OTHER PUBLICATIONS

Asif et al, "Data Compression Techniques for Urban Traffic Data", 2013, IEEE Symposium on Computational Intelligence in Vehicles and Transportation Systems, pp. 44-49. (Year: 2013).*
Bakalov et al, "Time Dependent Transportation Network Models", 2015, IEEE 31st International Conference on Data Engineering, pp. 1364-1375. (Year: 2015).*
Correa et al., "Wardrop equilibria," Wiley encyclopedia of operations research and management science (2011).
Peterson, Anders, "The origin-destination matrix estimation problem: analysis and computations," (2007).

* cited by examiner

*FIG. 7*

```
function TrafficPredWithDNN(historical_data, dnn_params_set):        720 historical_OD = ProcessDataset(historical_data)
    mask, compressed_data = CompressionWithSFC(historical_OD)
    training_set, test_set = SplitProcessDataset(compressed_data, deltaT, 0.33)
    best_result = inf
    curr_network = None
    for dnn_params in dnn_params_set:
        dnn_topology = SetDnnModel(dnn_params)
        trained_network = TrainDnn(dnn_topology, training_set)
        results = ApplyDNN(test_set, trained_network)
        if results < best_result:
            best_result = results
            curr_network = trained_network
    return mask, best_result, curr_network function ApplyCompressionAndDNN(trained_dnn, new_traffic_data, mask)        740 new_traffic_OD = ProcessDataset(new_traffic_data)
    _, new_compressed_traffic_data = CompressionWithSFC(new_traffic_OD)
    new_compressed_traffic_data, _ = SplitProcessDataset(new_compressed_traffic_data, deltaT, 1)
    compressed_predicitons = ApplyDNN(new_compressed_traffic_data, curr_network)
    traffic_prediction = DecompressInput(mask, compressed_predictions)

return traffic_prediction
```

```
• function main(historical_data, dnn_params_set, intervention_needed):  ⟵ 820
    mask, best_result, trained_dnn = TrafficPredWithDNN(historical_data, dnn_params_set)
    if intervention_needed:
        traffic_data = GetNewData()
        cost_set = GetCostSet()
        intervention_possibilities = GetInteventionPossibilities()
        min_cost, chosen_intervention = GetBestIntervention(trained_dnn, traffic_data,
                                        cost_set, intervention_possibilities)
• SendReportBack(min_cost, chosen_intervention)

• function GetBestIntervention(trained_dnn, traffic_data, cost_set,  ⟵ 840
                               intervention_possibilities):
• ## Function that implements traffic intervention evaluations
• ## An intervention is chosen based on simulation, prediction
• ## and its associated costs.

min_cost = inf
    chosen_intervention = None
    for intervention in intervention_possibilities:
        intervention_traffic_data = SimulateIntervention(traffic_data)
        impact_prediction = ApplyCompressionAndDNN(trained_dnn, intervention_traffic_data)
        intervention_cost = getTotalCosts(cost_set, impact_prediction, intervention)
        if intervention_cost < min_cost:
            min_cost = cost
            chosen_intervention = intervention
    return min_cost, chosen_intervention
```

FIG. 9

- ProcessDataset: Transforms Data in OD-Matrices
- CompressionWithSFC: Apply Space-Filling Curve to compress entries
- SplitProcessDataset: Generates training and test datasets by mounting tensors of input and output and then splitting processed dataset according to test/(train+test) ratio (3rd parameter)
- DecompressInput: Using given mask, decompresses given matrix To represent it back in traffic grid
- GetNewData: Gets new data from a (possibly) real-time source
- GetCostSet: Gets costs associated with interventions
- GetInteventionPossibilities: Gets a set of possibilites of Interventions for some desired action
- SendReportBack: Sends reports to user about which is best Intervention cost-wise
- getTotalCosts: Gets total cost of an intervention based on a Cost set, predicted impact on traffic and other costs associated with intervention

US 10,853,720 B1

TRAFFIC CONDITION FORECASTING USING MATRIX COMPRESSION AND DEEP NEURAL NETWORKS

FIELD

The field relates generally to information processing systems, and more particularly to traffic prediction in information processing systems.

BACKGROUND

Traffic prediction and representation is a crucial part of life in modern society. Individual users may increase their quality of life by avoiding traffic jams. In addition, enterprises and public entities may make money (or avoid losing money) by correctly maintaining traffic information. This information usually takes the form of a graph, where the nodes are points of interest, the edges are connections between these nodes, and edge weights are a measure of a cost to go from one node to another node. Depending on the granularity of the model used, these nodes could represent streets, quarters, intersections, neighborhoods or entire cities. The graph edges are typically labeled with the cost of using the connection, which can be a function of variables such as a time to a destination, a money cost and risk related information, among others.

A need exists for improved techniques for predicting traffic conditions.

SUMMARY

In one embodiment, a method comprises obtaining a compressed origination-destination matrix indicating a cost to travel between pairs of a plurality of nodes, wherein the compressed origination-destination matrix is compressed using a locality-aware compression technique that maintains only non-empty data; obtaining a trained deep neural network (DNN) trained using the compressed origination-destination matrix and past observations of traffic conditions at various times; and applying traffic conditions between two nodes in the compressed origination-destination matrix at a time, t, to the trained deep neural network to obtain predicted traffic conditions between the two nodes at a time, t+$\Delta$.

In one or more embodiments, the compressed origination-destination matrix comprises a stacked origination-destination matrix comprising a plurality of past observations, and a tensor is generated using the stacked origination-destination matrix indicating an evolution of traffic conditions over a time span represented by the plurality of past observations.

In some embodiments, the locality-aware compression technique comprises selecting a point-of-interest; creating a distance vector only for the non-empty data and applying a space-filling curve technique to the vector.

Other illustrative embodiments include, without limitation, apparatus, systems, methods and computer program products comprising processor-readable storage media.

BRIEF DESCRIPTION OF THE DRAWINGS

FIG. 7 illustrates exemplary pseudo code of a traffic prediction process using Deep Neural Networks, in one embodiment of the disclosure;

FIG. 8 illustrates exemplary pseudo code of an evaluation process for evaluating possible traffic interventions based on predicted traffic, according to one embodiment of the disclosure;

FIG. 9 illustrates exemplary pseudo code for a number of procedure calls referenced by the functions of FIGS. 7 and 8, in one embodiment of the disclosure.

DETAILED DESCRIPTION

Illustrative embodiments of the present disclosure will be described herein with reference to exemplary information processing systems and associated computers, servers, storage devices and other processing devices. It is to be appreciated, however, that embodiments of the disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. In many embodiments, an information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

One or more illustrative embodiments of the disclosure predict traffic conditions using matrix compression and Deep Neural Networks. As noted above, predicting traffic over time is an important task for modern centers, and is one important step in making smarter cities. The traffic grid of a big city is often a complex system, and performing predictive analysis over the traffic grid is often a complex task. One of the many issues involved in this task is developing a way to understand the grid interconnections and their usage by citizens and vehicles, which may change over time for a variety of reasons. Analyzing the traffic grid on a more granular manner is historically unpractical for a number of reasons, ranging from difficulties in ingesting and treating data in near-real time, to challenges with performing valuable analysis on a feasible time frame.

Figure 1:
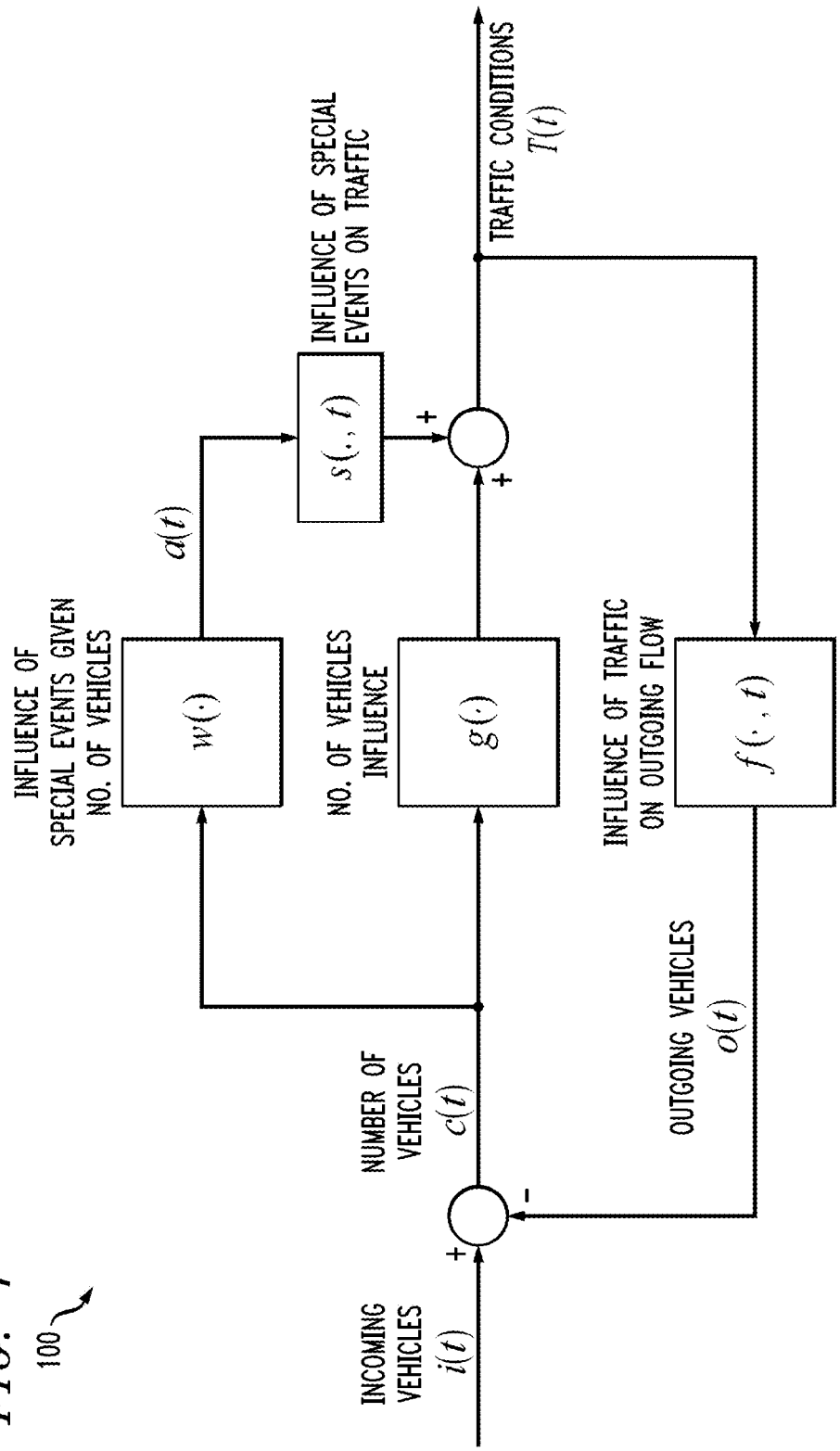
FIG. 1 is a block diagram illustrating an exemplary traffic condition system, according to one embodiment of the disclosure.

FIG. 1 is a block diagram illustrating an exemplary traffic condition system 100, according to one embodiment of the disclosure. In the exemplary traffic condition system 100 of FIG. 1, traffic conditions in a given area are modeled by a function, T(t), of the number of vehicles in the given area and the special events associated with the given area:

$$T(t)=g(c(t))+s(a(t),t),$$

where T(t) is the traffic condition measured in time to cross the area, g(.) and s(.,t) are continuous possibly non-differentiable functions indicating the influence on traffic from ingoing flow and the influence of the number of special events, respectively, c(t) is the number of vehicles in an area and a(t) is the number of accidents or other special events in a given area.

The effects of special events, such as accidents, in a single road are not trivially derived. While common sense is to consider these to propagate locally over time, this might not be the case. Another problem is to consider the present condition of a given area affected by a disruptive effect in another area. It is not clear how this variable affects the propagation of traffic jams and even if this effect is linear with respect to the present conditions.

The traffic conditions function, T(t), is computed by exemplary traffic condition system 100. As shown in FIG. 1, the function c(t) (i.e., the number of vehicles) can be measured by observing a sufficiently long time window and comparing the difference of incoming vehicles, i(t), entering the grid and outgoing vehicles, o(t), leaving the grid, as follows:

$$c(t)=c(t-\Delta t)+i(t)-o(t).$$

The function, s(.,t), that measures the influence of special events on traffic is more complex. The number of special events a(t) in FIG. 1, such as accidents, road blocks and other types of disruptive events, is a function w(.) of a number of unobservable variables, such as driver skills and proper road maintenance. If these variables are treated as immutable (e.g., analyzing a city during a small time window) what will be left is a strong correlation with the number of cars c(t) and a small correlation with the current time t (e.g., nighttime tends to produce more accidents than daytime, especially if the lights of the given area are inadequate). In one or more embodiments of the disclosure, s(.,t) is treated as a stochastic function of a(t), indicating an influence of the special events, given the number of vehicles, as follows:

$$s(a(t),t)=s(\omega(c(t)),t).$$

Having taken these functions into consideration, one or more embodiments of the present disclosure predict traffic conditions in a given area, T(t), for each edge representing connections between points of interest, given c(t−k*Δt), with k being an integer and varying in a subset of $\mathbb{N}$ and Δt being a positive real-valued variable that represents a certain amount of time.

One or more embodiments of the present disclosure recognize that it is costly and complex to implement the exemplary traffic condition system 100 of FIG. 1 on a Big Data scale.

As noted above, traffic prediction techniques often employ a graph where the nodes are points of interest, the edges are connections between these nodes, and edge weights are a measure of a cost to go from one node to another node. The graph edges are typically labeled with the cost of using the connection. Consider a cost function as a constant multiplied by the current average time taken by vehicles to go from a source node to a destination node on a given edge, as follows:

$$w(e_{kn})=c \cdot t_{kn} \cdot \delta_{kn},$$

where w is a function to assign weights, c is a constant, $t_{kn}$ is the average time needed to go from k to n, given a set of traffic conditions, and $\delta_{kn}$ is 1 if there exists a link going from node k to node n and 0 otherwise.

The costs can be estimated, for example, using data from smart phone applications, Call Detail Records (CDRs) and traffic cameras.

Figure 2:
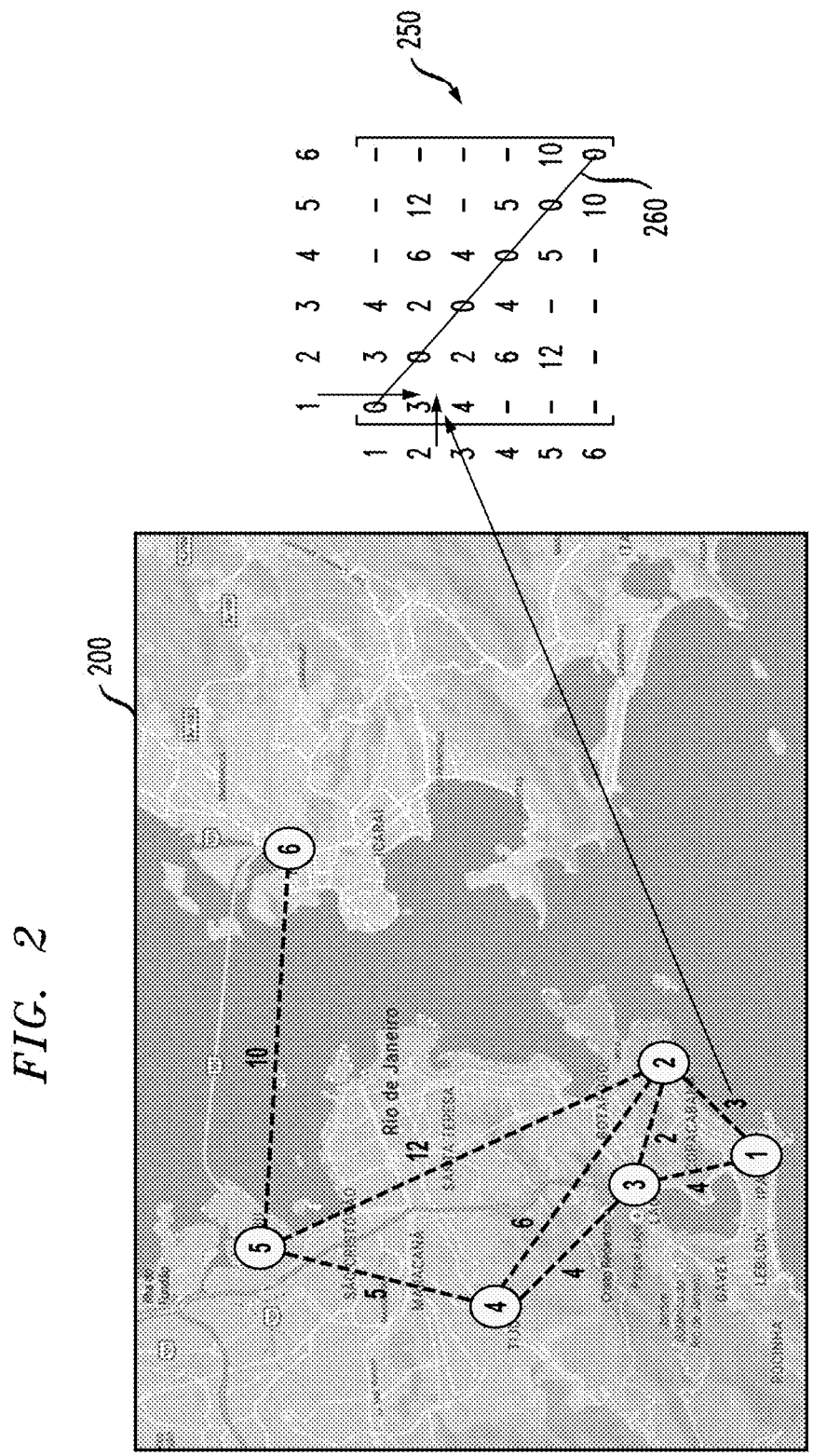
FIG. 2 illustrates an exemplary traffic grid over a map of a given region and a corresponding exemplary Origin-Destination matrix, in an embodiment of the disclosure.

FIG. 2 illustrates an exemplary traffic grid 200 over a map of a given region and a corresponding exemplary Origin-Destination matrix 250, according to one embodiment of the disclosure. The exemplary traffic grid 200 comprises nodes 1-6 corresponding to places of interest with edges (dashed lines) between nodes 1-6 representing connections between such places of interest. Each edge has a corresponding numeric edge weight providing a measure of a cost (typically, in time) to go from one node to another node.

The Origination-Destination (OD) matrix 250 (also referred to as an adjacency matrix) indicates the cost (typically, in time) of going from one node to another node in the exemplary traffic grid 200. After gathering nodes and edges information, OD-Matrices can be estimated using Wardrop Equilibrium theory. See, e.g., Jose R. Correa, and Nicolas E. Stier-Moses, "Wardrop Equilibria," Wiley Encyclopedia of Operations Research and Management Science (2011), incorporated by reference herein in its entirety.

In the embodiment of FIG. 2, the exemplary OD-matrix 250 is a square symmetric matrix, with zeros in the matrix diagonal 260, containing the costs of going from node i to j. For example, the edge between node 1 and node 2 has an edge weight of 3 which is stored in the cell associated with the path from node 1 to node 2, and also with the path from node 2 to node 1.

OD-matrices, such as the OD-matrix 250, are an important resource for traffic planners, as they can provide initial insights on possible bottlenecks, and can aid traffic planning in a macroscopic manner. On the other hand, traditional approaches for producing OD-matrices 250 are usually fairly inefficient, because only the upper triangle of the OD-matrices 250 offers new information. Half of the matrix 250 is, thus, populated with redundant information. Another typical problem with OD-matrices 250 comes from the fact that they are natively sparse. The node connectivity for some cases, like traffic, is orders of magnitude smaller than the number of nodes on the traffic grid 200, resulting in a lot of unused space.

Estimation problems using traditional OD-matrices is known to be computer-costly if smaller granularity is considered. While a city can be divided, for instance, in few regions of interest, it can also be divided in hundreds of neighborhoods which can themselves have dozens of streets, forming hundreds of corners themselves. The resultant OD-matrix considering this finer granularity can reach the order of tens of millions of weights, while being very sparse at the same time. One or more aspects of the invention recognize that ingesting big and sparse OD-matrices imposes computational challenges for forecasting and machine learning techniques.

In one or more embodiments, the OD-Matrices 250 can be compressed to represent only the non-empty edges in it. The compressed OD-Matrices, if converted to an image, will result in a much smaller representation when compared to the original OD-Matrix 250. One or more aspects of the disclosure recognize that Deep Neural Networks will benefit from this compressed approach for image processing, since the computing effort of a Deep Neural Network is directly related to the size of the images under study.

In some embodiments, efficient OD-matrices are constructed by ingesting and processing GPS data to generate and populate denser OD-matrices. With those matrices in hand, snapshots of the traffic condition evolving over time can be compared. Deep Neural Network techniques are employed to extract knowledge from the OD-matrices and learn using tensor patterns. In one or more embodiments, a collection of compressed OD-matrices representing past observations of traffic conditions over time are superimposed to form three dimensional tensors. These tensors are snapshots of the underlying relationships (possibly non-linear) between the traffic perceived in a given moment and the traffic perceived in the near future. Traffic changes slowly. Thus, for smaller sampling periods less than hours, the OD matrix of time k+1 will have a strong relation with the snapshot at time k.

The disclosed Deep Neural Network techniques for traffic prediction allows for a wider range of applications, when the Deep Neural Network efficiently learns, for example, the impact of uncommon events such as car accidents over nearby streets. The Deep Neural Network approach internally learns this impact without having to be fed specially for this task.

Matrix Compression and Deep Neural Networks

In one or more embodiments, Deep Learning techniques are applied to predict near-future traffic conditions gathered over, for example, fine GPS-location data generated by smartphones. A Origination-Destination matrix 250 is obtained indicating a cost to travel between pairs of a plurality of nodes. The Origination-Destination matrix 250 is compressed using a locality-aware compression technique that maintains only non-empty data, as discussed further below in conjunction with FIGS. 3 and 4. A Deep Neural Network (DNN) is trained using the compressed Origination-Destination matrix and past observations of traffic conditions at various times, as discussed further below in conjunction with FIG. 5. Traffic conditions at a time, t, between two nodes in the compressed Origination-Destination matrix is applied to the trained Deep Neural Network to obtain predicted traffic conditions between the two nodes at a near-future time, t+Δ, as discussed further below in conjunction with FIG. 6.

In various embodiments, the predicted traffic conditions may comprise, for example, a travel time and/or a cost-in-time between any pair of nodes.

Figure 3:
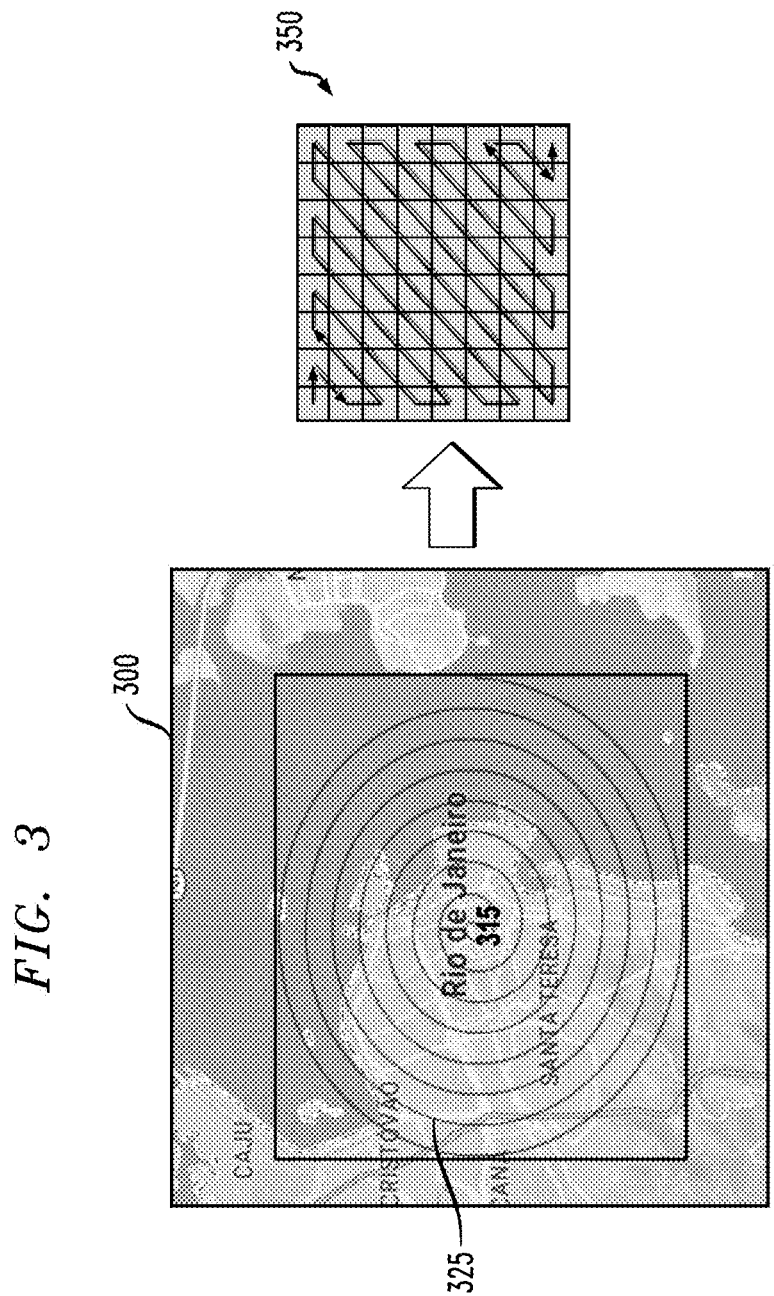
FIG. 3 illustrates a locality-aware compression of an exemplary map of a given region using space-filling curves, according to one embodiment of the disclosure.

FIG. 3 illustrates a locality-aware compression of an exemplary map 300 of a given region using space-filling curves (SFC) 325, according to one embodiment of the disclosure. One or more embodiments of the disclosure provide a more compact way to represent the traffic grid information in the OD-matrices 250 without losing any of the following:
the ability to characterize all traffic (No information loss); or
the ability to preserve locality of the data relative to geographical positioning (data points close in reality remain close on the representation).

As discussed further below in conjunction with FIG. 2, the disclosed locality-aware compression techniques leverage characteristics of the traffic grid 200 as a network: A great number of nodes but limited connection to other nodes. This characteristic distinguishes the traffic network from other networks such as the Web, Internet and Social networks.

In one or more embodiments, an exemplary representation starts with keeping only the existing edges instead of all connections between nodes. Since the traffic grid changes slowly, one can take advantage of this fact to represent only the existing edges with a value estimating the cost function (or edge weights) associated with the usage of that edge. This would be the same as representing the traffic grid as a static network, in which only edge weights vary. For instance, the relative cost function can be speed, distance and number of vehicles in a particular edge. For simplicity, in one embodiment of this disclosure, the average travel time between the nodes of the edge is used.

In order to preserve locality, a relative ordering of all existing nodes by their geolocations is employed, based on an appropriate proximity function such as Euclidean distance. This results in a vector of 1×n, where n is the number of nodes. A square matrix of size ceil($\sqrt{n}$)×ceil($\sqrt{n}$) can be populated. Nodes that are close in the real world would still be close in this represented version.

In the embodiment of FIG. 3, the traffic grid 200 is compressed in a manner that preserves data locality by applying space-filling curves 325. See, e.g., Hans Sagan, "Space-Filling Curves," Springer Science & Business Media (2012), incorporated by reference herein in its entirety. Generally, space-filling curves 325 leverage the creation of matrices given some vectors as input. Space-filling curves 325 preserve the input proximity on the vector dimensions. With the space-filling curves 325 at hand, the final goal becomes, then, to create vectors that translate closeness within its axis. A unidimensional vector, for example, represents in sequential positions items that are sequentially close on the real world.

In the embodiment of FIG. 3, the locality-aware compression starts by filling the space-filling curve 325 from a point of interest, such as point 315, and then calculating the distance from all other non-empty points to the origin and return those with the smallest distances. Applying this procedure repeatedly generates a so called space-filling curve vector. If the number of points reaches the order of thousands or more, other procedures, such as approximate nearest neighbors, can be used to populate the matrix. A zig-zag space-filling curve 350 can be employed to transform a sequential vector into a matrix.

Figure 4:
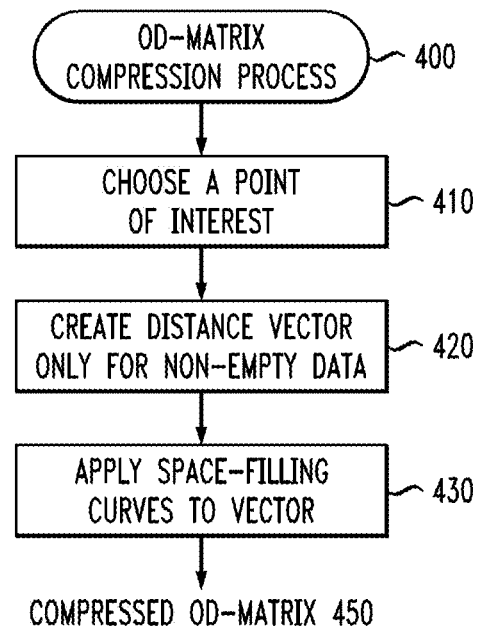
FIG. 4 is a flow chart illustrating an exemplary locality-aware Origin-Destination matrix compression process, in one embodiment of the disclosure.

FIG. 4 is a flow chart illustrating an exemplary locality-aware OD-Matrix compression process 400, according to one embodiment of the disclosure. As shown in FIG. 4, the exemplary locality-aware OD-Matrix compression process 400 initially chooses a point of interest 315 during step 410 and creates a distance vector during step 420 only for non-empty data. Space-filling curves are applied to the vector during step 430, to generate a compressed OD-matrix 450.

The particular processing operations and other system functionality described in conjunction with the flow diagram of FIG. 4 are presented by way of illustrative example only, and should not be construed as limiting the scope of the disclosure in any way. Alternative embodiments can use other types of processing operations involving compression of traffic grids. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different matrix compression instances within a given information processing system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 5:
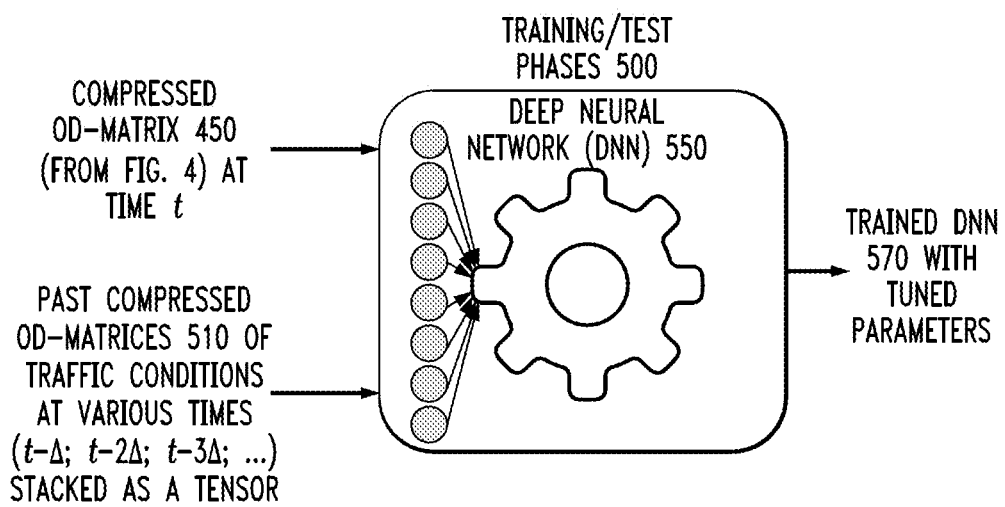
FIG. 5 illustrates an exemplary technique for training a Deep Neural Network, in at least one embodiment of the disclosure.

FIG. 5 illustrates an exemplary technique for training a Deep Neural Network (DNN) 550, in at least one embodiment of the disclosure. As shown in FIG. 5, during a training/test phase 500 a compressed Origination-Destination matrix 450 (e.g., generated by the compression process of FIG. 4 in one or more embodiments) for time, t, and past compressed Origination-Destination matrices 510 of traffic conditions at various times (t-Δ; t-2Δ; t-3Δ; . . . ) stacked as a tensor, are applied to the Deep Neural Network 550.

A Deep Neural Network typically refers to a multi-layered Neural Network, which might be comprised of Convolutional Layers, Activations Layers and Regular Layers. The portion of the DNN comprised of Convolutional Layers is usually referred to as Convolutional Neural Networks (CNNs).

The training/test phase 500 produces a trained Deep Neural Network 570 with tuned parameters, in a known manner.

Generally, the compressed OD-matrix 450 of time t may be 'stacked' with the past compressed Origination-Destination matrices 510 in order to build a tensor. This tensor teaches the DNN 550 the evolutions of traffic conditions over the time span. For example, if the DNN 550 is presented with t as input and t+Δ as output, the DNN 550 will learn how t affects t+Δ. However, if time t is also stacked with various past times (t-Δ; t-2Δ; t-3Δ; . . . ), in the form of a tensor (e.g., a three dimensional matrix), the DNN 550 will also be able to learn how, for the same cell on the grid, the behavior changes over time. In other words, for each cell in t+Δ (output) the effects will come not only from the same cell and its neighborhood in t, t-Δ; t-2Δ; t-3Δ; . . . , but also from the evolution (or the stacked relationship) of that neighborhood on the sensor (or three dimensional matrix).

Thus, in one or more embodiments, a given geographic path (e.g., edge) in the past compressed Origination-Destination matrices is expressed over time in substantially the same manner.

Generally, during the training/test phase 500, the Deep Neural Network 550 performs supervised learning on the historical data in the OD-matrices 450 and 510. A Deep Neural Network 550 is typically comprised of a collection of convolutional layers, regular layers and activation functions. The goal of a greater number of layers is to capture the possible non-linear relationships between points of the input tensors and the expected results contained in the output tensor.

For a more detailed discussion of techniques for training DNNs, see, for example, Stuart Russell and Peter Norvig, Artificial Intelligence: A Modern Approach, Chapter 18, (3$^{rd}$ Edition, 2010).

Figure 6:
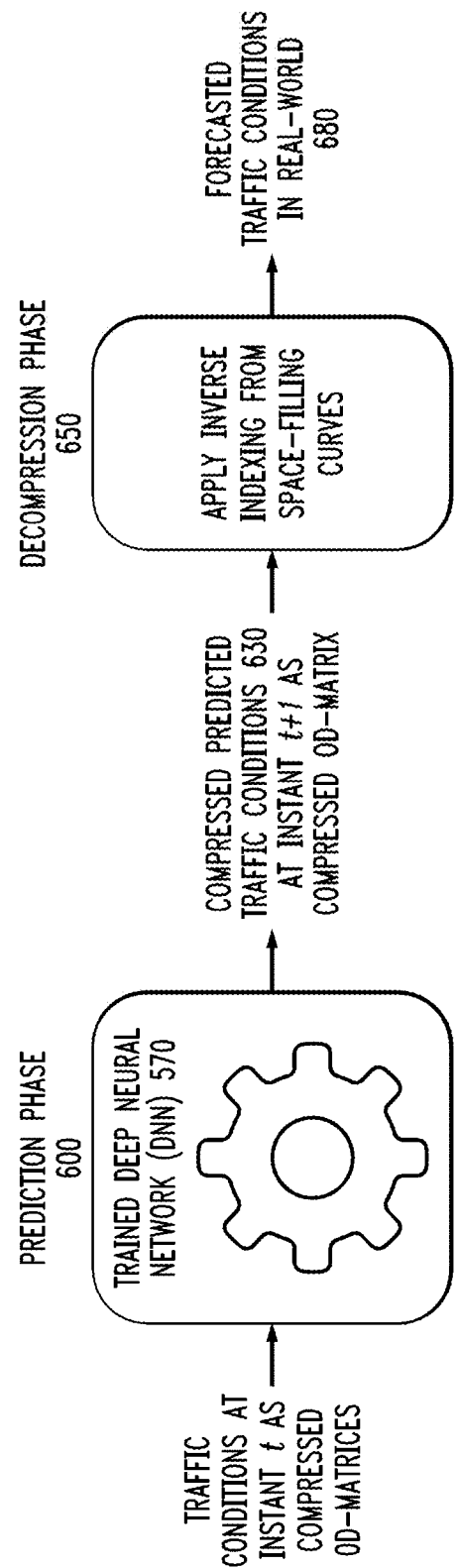
FIG. 6 illustrates an exemplary prediction of traffic conditions at a near-future time, t+$\Delta$, based on observed traffic conditions at a time, t, in some embodiments of the disclosure.

FIG. 6 illustrates an exemplary prediction of traffic conditions at a near-future time, t+Δ, based on observed traffic conditions at a time, t, in one embodiment of the disclosure. As shown in FIG. 6, the observed traffic conditions at time, t, are represented as a compressed Origination-Destination matrix that is applied to the trained Deep Neural Network 570 during a prediction phase 600.

The trained Deep Neural Network 570 will generate compressed predicted traffic conditions 630 between two nodes at a near-future time (e.g., t+1), also represented as a compressed Origination-Destination matrix.

The compressed Origination-Destination matrix representation 630 of the near-future traffic conditions at time, t+1, are optionally decompressed during a decompression phase 650. The compressed Origination-Destination matrix representation 630 of the near-future traffic conditions can be decompressed by applying inverse indexing from the space-filling curves applied by the locality-aware OD-Matrix compression process 400 to generate forecasted traffic conditions 680, as shown in FIG. 6.

In one or more embodiments, the trained Deep Neural Network 570 captures local relationships between pixels of an image. With the compressed representation generated by the locality-preserving compression process 400 of FIG. 4, locality of the points in the grid is preserved. Therefore, this compressed representation can be applied to the Deep Neural Networks 570.

For a more detailed discussion of techniques for using a DNN in an application phase, see, for example, Russell and Norvig, Artificial Intelligence: A Modern Approach, referenced above.

FIG. 7 illustrates exemplary pseudo code of a traffic prediction process 700 using DNNs, according to one embodiment of the disclosure. As shown in FIG. 7, a Traffic Prediction With DNN function 720 implements the training/test phase 500 of FIG. 5 by separating a historical dataset into a training data set and a test data set. The training data set is used to train the DNN 550 and the test data set is used to test the DNN 550.

An Apply Compression and DNN function 740 (FIG. 7) generates compressed traffic predictions 630 (FIG. 6) and decompresses the compressed traffic predictions 630 to generate forecasted traffic conditions 680.

A number of procedure calls used by the functions 720, 740 of FIG. 7 are discussed further below in conjunction with FIG. 9.

FIG. 8 illustrates exemplary pseudo code of a traffic prediction process 800 for evaluating possible traffic interventions based on the predicted traffic, according to one embodiment of the disclosure. Generally, policy makers can calculate the costs of traffic interventions in order to select, for example, the most cost effective alternative for the traffic grid. Those costs can be derived from multiple sources, including: high intervention frequency, high maintenance frequency, and construction of new streets.

Generally, various possible traffic interventions are simulated and a given intervention is selected based on prediction and associated costs. For example, various interventions may comprise changing lane directions, increasing or reducing wages or tolls for using certain streets, and placing more traffic agents on problematic intersections.

As shown in FIG. 8, a Main function 820 determines the cost associated with various possible traffic interventions and selects a substantially best intervention having a substantially minimal cost.

In addition, a Get Best Intervention function 840 (used by the Main function 820) uses simulations and selects the substantially best intervention having a substantially minimal cost.

Using the proposed Deep Learning approach alongside with these cost functions, policy makers can make predictions of their effectiveness on traffic and how the money spent on such interventions will return in time saved. In this manner, what-if scenarios are leveraged when the effects of rare events are propagated and the network internal behavior of accidents and obstructions can be learned, for example.

A number of procedure calls used by the functions 820, 840 of FIG. 8 are discussed further below in conjunction with FIG. 9.

FIG. 9 illustrates exemplary pseudo code of a number of procedure calls referenced by the functions of FIGS. 7 and 8, according to one embodiment of the disclosure.

Examples

Predicting Number of Accidents in a Given Area Over Given Time Range

Since the number of accidents is a function of current number of vehicles, as discussed above in conjunction with FIG. 1, the relationship between the number of accidents and past traffic conditions can be explored, which is also a function of the past number of vehicles using the traffic grid locally.

Policy makers can, then, use the disclosed traffic prediction methods to predict how many accidents or other kinds of traffic disruptive events will occur over a given time range, such as the next few hours, once those functions are trained to learn this kind of event.

Using these trained regressors in the DNNs, public agents can distribute, in advance, their resources around the city to minimize traffic flow damage. For instance, if a given region in the next hour has ten times more predicted accidents than another, then emergency responders, such as policemen, firefighters and ambulances, can be sent to the given region, in advance, using this information. This behavior, aside from improving city traffic, could achieve greater life savings, which are valuable statistics to governments.

Predicting Traffic Conditions in a Given Area Over Given Time Range

As stated above in conjunction with FIG. 1, there is a relationship between traffic jams, the amount of vehicles using the traffic grid, disruptive events and past traffic conditions. This relationship, however, may be non-linear and local-dependent. Using the disclosed methodology, Deep Neural Networks can be used to discover these possibly non-linear relationships based on the training data. The training/testing phase 500 may produce trained DNNs 570 comprising regressors representing the potentially non-linear relationships of the traffic grid.

This new data-driven prediction would allow policy makers to perform timely interventions on such occasions, preventing or reducing traffic jams that would otherwise occur. The prevention can be performed in a number of ways, such as changing lane directions, reducing wages or tolls for using certain streets, and augmenting the cost of others, and placing more traffic agents on problematic intersections.

The exemplary pseudo code 800 of FIG. 8 can be employed to calculate what these actions would result in terms of traffic reduction and cost. The policy maker can, then, choose the most cost-effective alternative to reduce traffic to acceptable levels.

Finding Critical Relationships by Exploring Network Internal Structure

Once trained, the trained DNNs 570 leverage a wide range of exploratory analysis. With simulated data, not only what-if questions can be answered, but also wider ones such as rankings and relative comparisons. Imagine, for instance, that users or policy makers want to identify the top N (e.g., N=10) paths most sensible to disturbances on a network. The users may simulate disturbances in a stochastic way (guided by historical data) and analyze the network output as an aggregate. Comparing the pairs of nodes that suffered the most may very well give them the answers they need.

Another exploratory analysis derived from simulation, now possible because the trained DNNs 570 already know how to represent how an area behaves, is the substantially optimal location of rescue and emergency teams according to the impact on the events. Simulating scenarios and aggregating response time is a good way to optimize the deployment of rescue crews.

Real-Time Incident Identification Using Traffic Data

The non-linear relationship between an incident and its impact on the closer points may be used to classify normal/affected regions. Using available incident data, one may train a DNN to identify whether a region or a street has incidents before reported by any other channel.

Users may publish incident information on official Twitter™ channels or other available tools, but this traditional approach demands user interference. With CDR or mobile data, however, the own data carries all the information needed for a more proactive approach. Before users report Waze™ or Twitter™ events, the disclosed system can identify abnormal changes in traffic flow and classify the changes as incidents automatically, potentially gaining important reaction time.

CONCLUSION

One or more embodiments of the disclosure perform traffic prediction using Deep Neural Networks (DNNs) to learn to predict traffic conditions in the near future. In one or more embodiments, Origin-Destination Matrices are converted into images using locality aware compression based on Space-Filling Curves (SFC). The compressed OD matrices are applied to a Deep Neural Network during a training phase to train the Deep Neural Network to learn to predict traffic conditions, during a prediction phase, in the near-future. Among other benefits, the underlying information from the OD-matrices can be used to answer what-if questions regarding various possible traffic redemption interventions.

It should be understood that the particular information processing system and process arrangements illustrated in FIGS. 1 through 9 are presented by way of illustrative example only, and should not be construed as limiting in any way. Numerous alternative configurations of system and device elements and associated processing operations can be used in other embodiments.

In these and other embodiments, compute services can be offered to cloud infrastructure tenants or other system users as a PaaS offering, although numerous alternative arrangements are possible.

Illustrative embodiments disclosed herein can provide a number of significant advantages relative to conventional arrangements.

For example, one or more embodiments provide significantly improved prediction of traffic conditions. It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the traffic prediction system may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as locality-aware compression 400, or portions thereof, are illustratively implemented for use by tenants of such a multi-tenant environment.

As mentioned previously, cloud infrastructure as disclosed herein can include cloud-based systems such as AWS, GCP and Microsoft Azure™. Virtual machines provided in such systems can be used to implement at least portions of a traffic prediction services platform in illustrative embodiments. The cloud-based systems can include object stores such as Amazon™ S3, GCP Cloud Storage, and Microsoft Azure™ Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the traffic prediction system. For example, containers can be used to implement respective processing devices providing traffic prediction services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of a traffic prediction system, these platforms may also be used to implement at least portions of other information processing systems in other embodiments.

Figure 10:
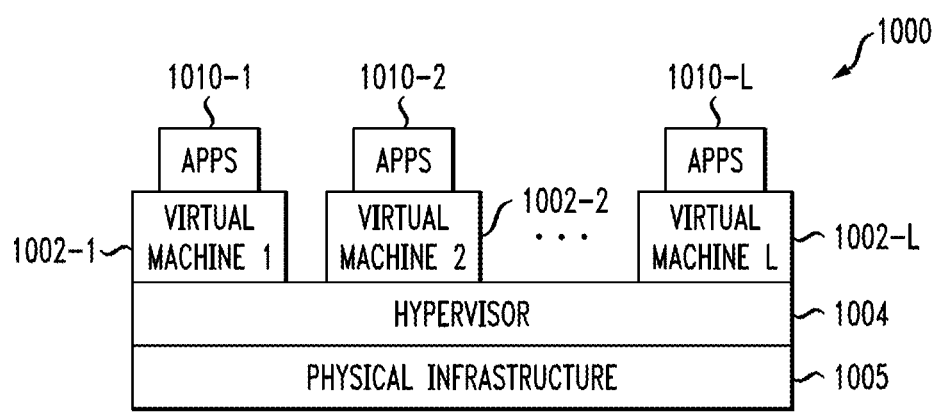
FIGS. 10 and 11 show examples of processing platforms that may be utilized to implement at least a portion of an information processing system in illustrative embodiments of the present disclosure.
Figure 11:
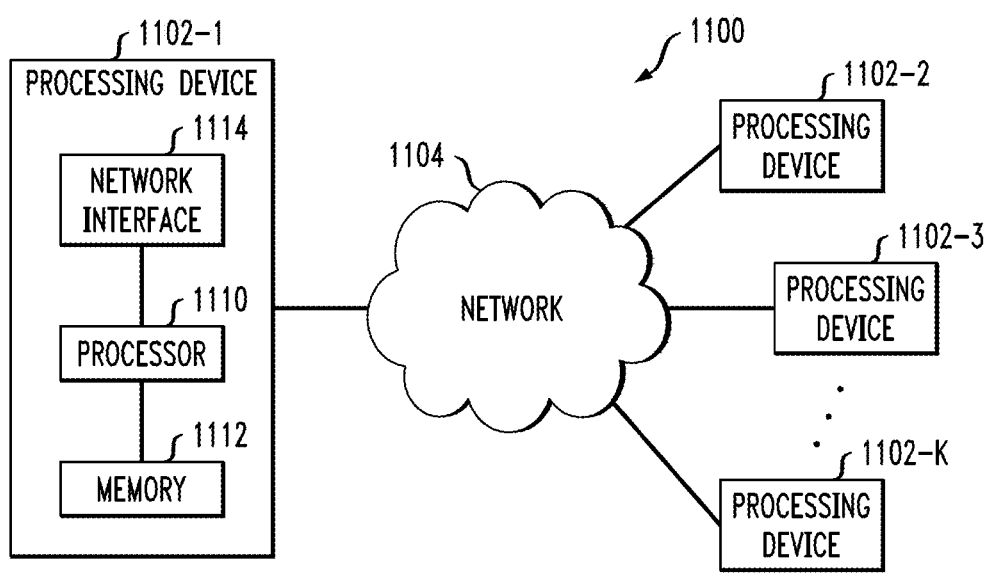

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises virtual machines (VMs) 1002-1, 1002-2, . . . 1002-L implemented using a hypervisor 1004. The hypervisor 1004 runs on physical infrastructure 1005. The cloud infrastructure 1000 further comprises sets of applications 1010-1, 1010-2, . . . 1010-L running on respective ones of the virtual machines 1002-1, 1002-2, . . . 1002-L under the control of the hypervisor 1004.

Although only a single hypervisor 1004 is shown in the embodiment of FIG. 10, the traffic prediction system may of course include multiple hypervisors each providing a set of virtual machines using at least one underlying physical machine. Different sets of virtual machines provided by one or more hypervisors may be utilized in configuring multiple instances of various components of the traffic prediction system.

An example of a commercially available hypervisor platform that may be used to implement hypervisor 1004 and possibly other portions of the information processing system in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of a traffic prediction system may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of a traffic prediction system and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the locality-aware compression 400 and prediction phase processing 600 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and traffic prediction systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a compressed origination-destination matrix indicating a cost to travel between pairs of a plurality of nodes, wherein said compressed origination-destination matrix is compressed using a locality-aware compression technique that maintains only non-empty data, wherein the compressed origination-destination matrix is created by:
selecting a point-of-interest;
creating a distance vector only for said non-empty data; and
applying a space-filling curve technique from the selected point-of-interest to said distance vector;
obtaining a trained deep neural network trained using said compressed origination-destination matrix and past observations of traffic conditions at various times; and
applying traffic conditions between two nodes in said compressed origination-destination matrix at a time, t, to said trained deep neural network to obtain predicted traffic conditions between said two nodes at a time, t+$\Delta$.

2. The method of claim 1, wherein said predicted traffic conditions comprise one or more of a travel time and a cost-in-time between any pair of nodes.

3. The method of claim 1, wherein said compressed Origination-Destination matrix comprises a stacked origination-destination matrix comprising a plurality of past observations.

4. The method of claim 3, further comprising generating a tensor using said stacked origination-destination matrix indicating an evolution of traffic conditions over a time span represented by said plurality of past observations.

5. The method of claim 1, wherein said traffic conditions at a time, t, are compressed using said locality-aware compression technique.

6. The method of claim 1, wherein said training of said deep neural network comprises a supervised learning using said compressed origination-destination matrix with additional compressed origination-destination matrices representing said past observations of traffic conditions at various times.

7. The method of claim 1, further comprising predicting a number of predefined traffic disruptions in a given area in a predefined time period based on a predicted number of vehicles in said given area obtained using said trained deep neural network.

8. The method of claim 1, further comprising predicting a traffic condition in a given area in a predefined time period based on a predicted number of vehicles in said given area obtained using said trained deep neural network.

9. The method of claim 1, further comprising identifying a top N list of paths between two nodes that are most impacted by one or more predefined traffic disturbances using said trained deep neural network.

10. The method of claim 1, further comprising forecasting one or more geographic areas having one or more predefined traffic disturbances in a near future using said trained deep neural network.

11. A computer program product, comprising a non-transitory machine-readable storage medium having encoded therein executable code of one or more software programs, wherein the one or more software programs when executed by at least one processing device perform the following steps:

obtaining a compressed origination-destination matrix indicating a cost to travel between pairs of a plurality of nodes, wherein said compressed origination-destination matrix is compressed using a locality-aware compression technique that maintains only non-empty data, wherein the compressed origination-destination matrix is created by:
selecting a point-of-interest;
creating a distance vector only for said non-empty data; and
applying a space-filling curve technique from the selected point-of-interest to said distance vector;
obtaining a trained deep neural network trained using said compressed origination-destination matrix and past observations of traffic conditions at various times; and
applying traffic conditions between two nodes in said compressed origination-destination matrix at a time, t, to said trained deep neural network to obtain predicted traffic conditions between said two nodes at a time, t+Δ.

12. An apparatus, comprising:
a memory; and
at least one processing device, coupled to the memory, operative to implement the following steps:
obtaining a compressed origination-destination matrix indicating a cost to travel between pairs of a plurality of nodes, wherein said compressed origination-destination matrix is compressed using a locality-aware compression technique that maintains only non-empty data, wherein the compressed origination-destination matrix is created by:
selecting a point-of-interest;
creating a distance vector only for said non-empty data; and
applying a space-filling curve technique from the selected point-of-interest to said distance vector;
obtaining a trained deep neural network trained using said compressed origination-destination matrix and past observations of traffic conditions at various times; and
applying traffic conditions between two nodes in said compressed origination-destination matrix at a time, t, to said trained deep neural network to obtain predicted traffic conditions between said two nodes at a time, t+Δ.

13. The apparatus of claim 12, wherein said compressed origination-destination matrix comprises a stacked origination-destination matrix comprising a plurality of past observations.

14. The apparatus of claim 13, further comprising generating a tensor using said stacked origination-destination matrix indicating an evolution of traffic conditions over a time span represented by said plurality of past observations.

15. The apparatus of claim 12, wherein said training of said deep neural network comprises a supervised learning using said compressed origination-destination matrix with additional compressed origination-destination matrices representing said past observations of traffic conditions at various times.

16. The apparatus of claim 12, further comprising predicting one or more of a number of predefined traffic disruptions and a traffic condition in a given area in a predefined time period based on a predicted number of vehicles in said given area obtained using said trained deep neural network.

17. The apparatus of claim 12, further comprising identifying a top N list of paths between two nodes that are most impacted by one or more predefined traffic disturbances using said trained deep neural network.

18. The apparatus of claim 12, further comprising forecasting one or more geographic areas having one or more predefined traffic disturbances in a near future using said trained deep neural network.

19. The computer program product of claim 11, further comprising predicting a number of predefined traffic disruptions in a given area in a predefined time period based on a predicted number of vehicles in said given area obtained using said trained deep neural network.

20. The computer program product of claim 11, further comprising predicting a traffic condition in a given area in a predefined time period based on a predicted number of vehicles in said given area obtained using said trained deep neural network.

* * * * *